(12) United States Patent
Wilhelmsson et al.

(10) Patent No.: US 10,797,929 B2
(45) Date of Patent: Oct. 6, 2020

(54) GENERATING AN FSK SIGNAL COMPRISED IN AN OFDM SIGNAL

(71) Applicant: Telefonaktiebolaget LM Ericsson (publ), Stockholm (SE)

(72) Inventors: Leif Wilhelmsson, Lund (SE); Miguel Lopez, Solna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/604,139

(22) PCT Filed: Apr. 25, 2017

(86) PCT No.: PCT/EP2017/059756
§ 371 (c)(1),
(2) Date: Oct. 9, 2019

(87) PCT Pub. No.: WO2018/196954
PCT Pub. Date: Nov. 1, 2018

(65) Prior Publication Data
US 2020/0162306 A1 May 21, 2020

(51) Int. Cl.
*H04L 27/26* (2006.01)

(52) U.S. Cl.
CPC .................. *H04L 27/2697* (2013.01)

(58) Field of Classification Search
CPC ... H04L 5/0007; H04L 27/10; H04L 27/2627; H04L 27/2634; H04L 27/2697; H04B 1/69; H04B 1/707; H04B 7/0413
See application file for complete search history.

(56) References Cited

U.S. PATENT DOCUMENTS

| 9,036,735 B1 * | 5/2015 | Park ...................... H04B 1/0475 375/296 |
| 10,491,261 B1 * | 11/2019 | Al-Eidan ................ H04L 27/18 |

(Continued)

FOREIGN PATENT DOCUMENTS

| WO | 2009156846 A1 | 12/2009 |
| WO | 2016029343 A1 | 3/2016 |

OTHER PUBLICATIONS

PCT International Search Report, dated Jan. 22, 2018, in connection with International Application No. PCT/EP2017/059756, all pages.

(Continued)

*Primary Examiner* — Khanh C Tran
(74) *Attorney, Agent, or Firm* — Leffler Intellectual Property Law, PLLC

(57) ABSTRACT

A method is disclosed of generating a frequency shift keying (FSK) signal comprised in an orthogonal frequency division multiplexing (OFDM) signal comprising a plurality of sub-carriers. The FSK signal comprises FSK symbols wherein each FSK symbol has a corresponding FSK symbol frequency. The method comprises assigning a set of adjacent sub-carriers to transmission of the FSK signal (wherein the set is a sub-set of the plurality of sub-carriers), and associating each FSK symbol frequency with a corresponding sub-carrier in the set of adjacent sub-carriers. The method also comprises selecting, for each FSK symbol to be transmitted, an FSK symbol phase such that an FSK signal phase at a start of the FSK symbol to be transmitted meets a phase difference criterion in relation to the FSK signal phase at an end of an immediately previous FSK symbol. The method further comprises generating the FSK signal comprising the FSK symbol to be transmitted by modulating the sub-carrier corresponding to the FSK symbol frequency based on the selected FSK symbol phase and muting the remaining (Continued)

sub-carriers of the set. Corresponding arrangement, access point and computer program product are also disclosed.

18 Claims, 3 Drawing Sheets

(56) References Cited

U.S. PATENT DOCUMENTS

| | | |
|---|---|---|
| 2002/0176510 A1 | 11/2002 | Laroia |
| 2005/0018783 A1* | 1/2005 | Nakache ............ H04L 27/2602 375/260 |
| 2012/0147814 A1 | 6/2012 | Valvonesi |
| 2013/0294219 A1* | 11/2013 | Peck ................... H04L 27/2637 370/210 |
| 2014/0177687 A1* | 6/2014 | Seol ....................... H04L 27/34 375/219 |
| 2014/0177756 A1* | 6/2014 | Park ..................... H04L 27/183 375/298 |
| 2015/0358194 A1* | 12/2015 | Yu ........................ H04L 1/0041 370/329 |
| 2016/0191214 A1* | 6/2016 | Hong ................... H04L 25/067 370/252 |
| 2016/0366006 A1* | 12/2016 | Hong ................... H04L 27/362 |

OTHER PUBLICATIONS

PCT Written Opinion, dated Jan. 22, 2018, in connection with International Application No. PCT/EP2017/059756, all pages.

* cited by examiner

US 10,797,929 B2

GENERATING AN FSK SIGNAL COMPRISED IN AN OFDM SIGNAL

TECHNICAL FIELD

The present disclosure relates generally to the field of wireless communication. More particularly, it relates to generation of a frequency shift keying (FSK) signal comprised in an orthogonal frequency division multiplexing (OFDM) signal.

BACKGROUND

Internet of Things, IoT, is expected to increase the number of connected wireless devices significantly. A number of devices, e.g. household appliances such as microwave ovens, operate at frequencies around 2.4 GHz. The electromagnetic emissions from these devices risk producing interference with wireless communication devices in the vicinity operating near the same frequency. To avoid interference from devices not intended for wireless communication certain frequency bands have been reserved for wireless communication purposes via international agreements. The use of the reserved frequency bands is regulated using licenses, which is why these bands are often called licensed bands. Analogously, bands not reserved and hence not regulated using licenses are called unlicensed bands. The industrial, scientific and medical (ISM)-band at 2.4 GHz band is an example of an unlicensed band.

A vast majority of the IoT-devices will likely operate in unlicensed bands, in particular the 2.4 GHz ISM band. At the same time, there is also increased demand for using the unlicensed bands for services that traditionally have been supported in licensed bands. As an example of the latter, 3GPP, that traditionally develop specifications only for licensed bands has now also developed versions of Long Term Evolution, LTE, which will operate in the 5 GHz unlicensed band.

Technologies that are expected to dominate for IoT services are Bluetooth Wireless Technology, in particular Bluetooth Low Energy, BLE, and future versions of IEEE 802.11 like 802.11ax. With respect to IEEE 802.11, it can be expected that there will be efforts to standardize a mode suitable to support IoT, which at least to some extent builds on 802.11ax.

IoT applications are foreseen to most often have rather different requirement and features compared to applications like e.g. file down-load and video streaming. Specifically, IoT applications would typically only require low data rate and the amount of data transmitted in a single packet may many times only be a few bytes. In addition, the transmissions to and from many devices will be very seldom, e.g. once an hour or even less often. However, the number of IoT devices is expected to be huge, which means that although the amount of data to each one of the devices may be small, the aggregated IoT data may still be substantial.

Many use cases for IoT applications can be found in an ordinary home, and may be related to various sensors, actuators, etc. The requirements for coverage are therefore substantially less demanding than what usually can be achieved by e.g. a cellular system. On the other hand, the coverage which can be obtained by e.g. Bluetooth or IEEE 802.11b/g/n/ac may not suffice. This may be in particular true if one of the devices is outdoors whereas the other device is indoors so that an exterior wall with rather high penetration loss is in between the devices.

Due to this short-coming of current versions of Bluetooth Wireless Technology and IEEE 802.11, both these standardization organizations are working on new versions that would significantly increase the coverage.

A straightforward approach to increase the range of a communication link is to reduce the bit rate that is used. Reducing the bit rate by necessity means that it will take longer to transmit a packet of a certain size. As a side effect of this, the channel will be occupied for a longer time. Now, with a large number of devices sharing the same channel, the channel may be congested if this sharing is not done in an effective way. The need for long packets and the increased number of users will make this congestion even more pronounced.

Moreover, the amount of non-IoT data, e.g. data download and video streaming, transmitted over the same channel may also increase. This implies that to obtain good performance for both IoT applications and non-IoT applications, some coordination should preferably take place. Today there is no single standard that effectively supports both high data rate application and very low cost IoT applications, like sensors. The main standard for the former is IEEE 802.11, e.g. 802.11n and 802.11ac, whereas the main standard for the latter is Bluetooth Low Energy. Hence, two systems typically need to operate in parallel and preferably in a synchronized fashion.

An obvious, and probably the simplest, way to do such coordination is by time sharing between the systems. For example, each system is assigned time slots where data may be transmitted or received according to a predetermined scheme. This is commonly referred to as Time Division Multiplexing, TDM. In each time slot assigned to a specific system, this system may then for instance use Time Division Duplex, TDD, which is a common way of implementing time sharing, wherein users are assigned time slots for uplink and downlink transmission. The main reason for TDD is that it allows for low cost implementation without the need for costly duplex filters, which are needed in case frequency division duplex, FDD, is employed. However, as the data rate for the IoT system is very low for the individual links, it may likely be hard to obtain good spectrum efficiency using TDM to share the time between the systems.

Instead it would be preferable if the two systems, i.e., both the IoT system and the non-IoT system could operate concurrently. One means to achieve this could be if the non-IoT system would be based on orthogonal frequency division multiplexing, OFDM. The approach of using OFDM is conceptually simple since concurrent operation then could be achieved by assigning one or more subcarriers to the IoT system and the remaining ones to the non-IoT system. The number of subcarriers allocated to the IoT system could in this way be rather flexible.

For example, a multi-modulation transmitter may be configured to transmit a multicarrier signal to multiple different receivers, wherein at least one of the receivers is a receiver using a modulation scheme other than Orthogonal Frequency-Division Multiplexing, OFDM. The multi-modulation transmitter may comprise a data mapping unit configured to map data targeting the different receivers to mutually orthogonal subcarrier signals, in accordance with the respective modulation schemes of the different receivers. The multi-modulation transmitter may also comprise an Inverse Fast Fourier Transform, IFFT, unit configured to transform the mutually orthogonal subcarrier signals to a multicarrier signal in the time domain. The multi-modulation transmitter may further comprise a cyclic prefix unit configured to insert a determined Cyclic Prefix in the multicarrier signal. The multi-modulation transmitter may additionally comprise a radio unit configured to transmit the multicarrier signal to the multiple different receivers. The proposed transmitter may enable a network node (access point), which supports concurrent use of different types of wireless devices, one able to transmit and receive high data rates, the other only able to transmit and receive considerably lower data rates.

In a typical scenario, an IoT device may be adapted to receive signals transmitted according to Bluetooth Wireless Technology, which is based on Gaussian Frequency Shift Keying (GFSK). GFSK is a constant envelope modulation which allows for extremely cost efficient implementations. At the receiver side, a simple limiting receiver may be used, i.e., the analog-to-digital converter (ADC) may be replaced by a simple comparator and there will essentially be no need for automatic gain control (AGC) in the receiver, further simplifying the implementation and reducing the cost. Even more significant is the gain at the transmitter side. Due to that GFSK is constant envelope, there is much less need to back-off the power amplifier (PA) and the linearity requirements for the PA are considerably less stringent, so that significantly higher power efficiency can be obtained. Since an IoT device, such a sensor, may be powered by a coin battery, this is very important since power efficiency is one of the key features.

The above exemplified multi-modulation transmitter may, in such a scenario, apply frequency shift keying (FSK) to transmit to an IoT device adapted for GFSK reception. However, the fact that the generated signal is not GFSK will have some impact in the GFSK demodulator in that the IFFT generated FSK signal will be more distorted than a proper GFSK signal when filtered by the channel selective filter in the IoT device. In addition, the wider spectrum of the IFFT generated FSK signal may also cause additional interference in adjacent channels.

Therefore, there is a need for alternative approaches to generating a frequency shift keying (FSK) signal comprised in an orthogonal frequency division multiplexing (OFDM) signal. Preferably, such approaches minimize, or at least mitigate, distortion caused by such generation compared to generation of a GFSK signal not comprised in an OFDM signal.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Reference will be made herein to IoT devices and applications and to various standards from communication. It should be noted that such references are merely illustrative and by no means limiting. Contrarily, embodiments may be equally applicable to any scenario where an FSK signal is generated as comprised in an OFDM signal.

It is an object of some embodiments to solve or mitigate, alleviate, or eliminate at least some of the above or other disadvantages.

According to a first aspect, this is achieved by a method of generating a frequency shift keying (FSK) signal comprised in an orthogonal frequency division multiplexing (OFDM) signal comprising a plurality of sub-carriers. The FSK signal comprises FSK symbols wherein each FSK symbol has a corresponding FSK symbol frequency.

The method comprises assigning a set of adjacent sub-carriers to transmission of the FSK signal wherein the set is a sub-set of the plurality of sub-carriers, and associating each FSK symbol frequency with a corresponding sub-carrier in the set of adjacent sub-carriers.

The method also comprises selecting (for each FSK symbol to be transmitted) an FSK symbol phase such that an FSK signal phase at a start of the FSK symbol to be transmitted meets a phase difference criterion in relation to the FSK signal phase at an end of an immediately previous FSK symbol.

Furthermore, the method comprises generating the FSK signal comprising the FSK symbol to be transmitted by modulating the sub-carrier corresponding to the FSK symbol frequency based on the selected FSK symbol phase and muting the remaining sub-carriers of the set.

Generally, the FSK signal phase is a function of time. The FSK symbol phase is typically equal to the FSK signal phase at a time corresponding to an end of a cyclic prefix of a symbol of the OFDM signal.

According to some embodiments, the method may further comprise transmitting the OFDM signal.

The set of adjacent sub-carriers may correspond to one or more resource units (RU) of the OFDM signal according to some embodiments.

In some embodiments, selecting the FSK symbol phase may comprise selecting a default or random FSK symbol phase for an initial FSK symbol in the FSK signal.

According to some embodiments, modulating the sub-carrier corresponding to the FSK symbol frequency based on the selected FSK symbol phase may comprise letting an input of an inverse fast Fourier transform (IFFT) modulator be a complex number having the selected FSK symbol phase, wherein the input is for the sub-carrier corresponding to the FSK symbol frequency. In some embodiments, the FSK symbol may have an FSK symbol amplitude manifested via the complex number.

According to some embodiments, muting the remaining sub-carriers of the set may comprise letting inputs of an inverse fast Fourier transform (IFFT) modulator be equal to zero, wherein the inputs are for the sub-carriers of the set not corresponding to the FSK symbol frequency.

The phase difference criterion may, according to some embodiments, comprise an absolute phase difference being less than a phase difference threshold, wherein the absolute phase difference is determined between the FSK signal phase at the start of the FSK symbol to be transmitted and the FSK signal phase at the end of the immediately previous FSK symbol.

In some embodiments, an out-of-band emission may be a parameter of the phase difference criterion. For example, the phase difference criterion may comprise an absolute phase difference being less than a phase difference threshold, wherein the value of the phase difference threshold depends from an acceptable level of out-of-band emission (e.g. a spectrum mask).

Selecting the FSK symbol phase may, in some embodiments, comprise selecting a phase of a phase shift keying (PSK) signal constellation, wherein an absolute phase difference between the selected phase and the FSK signal phase at the end of the immediately previous FSK symbol is smaller than an absolute phase difference between any other phase of the PSK signal constellation and the FSK signal phase at the end of the immediately previous FSK symbol.

In some embodiments, the selection may comprise comparing all absolute phase differences between any phase of the PSK signal constellation and the FSK signal phase at the end of the immediately previous FSK symbol, and selecting the phase corresponding to the smallest absolute phase difference.

The PSK signal constellation may, for example, have size 2, 4, 8 or 16. Generally, the above approach is not limited to pure PSK signal constellations. Contrarily, any suitable constellation where different signal points have different phase would be suitable.

According to some embodiments, the phase difference criterion may comprise the FSK signal phase at the start of the FSK symbol to be transmitted being equal to the FSK signal phase at the end of the immediately previous FSK symbol.

In some embodiments, selecting the FSK symbol phase may comprise relating the FSK symbol phase to be selected to the FSK signal phase at the start of the FSK symbol to be transmitted via the corresponding FSK symbol frequency.

In some embodiments, selecting the FSK symbol phase may comprise relating the FSK symbol phase to be selected to the FSK signal phase at the start of the FSK symbol to be transmitted via a ratio between a duration of a cyclic prefix of the OFDM signal and a duration of an OFDM symbol of the OFDM signal without the cyclic prefix.

According to some embodiments, selecting the FSK symbol phase may comprise letting the FSK symbol phase to be selected equal the FSK signal phase at the start of the FSK symbol to be transmitted plus a compensation term which is based on the ratio and on a difference between the FSK symbol frequency and a center frequency of the set of adjacent sub-carriers.

The FSK signal may be for transmission to a receiver configured to receive an FSK signal according to some embodiments. In some embodiments, the FSK frequencies may correspond to frequencies compliant with a Bluetooth Low Energy specification. Then, a receiver configured to operate in accordance with a Bluetooth Low Energy specification (thus adapted to receive a Gaussian FSK signal) may be used also for reception of the FSK signal generated according to embodiments described herein.

The FSK frequencies may correspond to frequencies compliant with a Bluetooth Low Energy specification according to some embodiments.

A second aspect is a computer program product comprising a computer readable medium, having thereon a computer program comprising program instructions. The computer program is loadable into a data processing unit and configured to cause execution of the method according to the first aspect when the computer program is run by the data processing unit.

A third aspect is an arrangement for an orthogonal frequency division multiple access (OFDMA) transmitter for generation of a frequency shift keying (FSK) signal comprised in an orthogonal frequency division multiplexing (OFDM) signal comprising a plurality of sub-carriers. The FSK signal comprises FSK symbols wherein each FSK symbol has a corresponding FSK symbol frequency.

The arrangement comprises a controller configured to cause assignment of a set of adjacent sub-carriers to transmission of the FSK signal wherein the set is a sub-set of the plurality of sub-carriers, and association of each FSK symbol frequency with a corresponding sub-carrier in the set of adjacent sub-carriers.

The controller is also configured to cause selection, for each FSK symbol to be transmitted, of an FSK symbol phase such that an FSK signal phase at a start of the FSK symbol to be transmitted meets a phase difference criterion in relation to the FSK signal phase at an end of an immediately previous FSK symbol.

Furthermore, the controller is configured to cause generation of the FSK signal comprising the FSK symbol to be transmitted by modulation of the sub-carrier corresponding to the FSK symbol frequency based on the FSK symbol phase and muting the remaining sub-carriers of the set.

The assignment may be performed by a scheduler according to some embodiments. The selection may be performed by a phase selector according to some embodiments. The generation may be performed by a signal generator (e.g. an IFFT modulator) according to some embodiments.

In some embodiments, the controller may also be configured to cause transmission of the OFDM signal by a transmitter.

A fourth aspect is an arrangement for an orthogonal frequency division multiple access (OFDMA) transmitter for generation of a frequency shift keying (FSK) signal comprised in an orthogonal frequency division multiplexing (OFDM) signal comprising a plurality of sub-carriers.

The FSK signal comprises FSK symbols wherein each FSK symbol has a corresponding FSK symbol frequency.

The arrangement comprises a scheduler (e.g. scheduling circuitry) configured to assign a set of adjacent sub-carriers to transmission of the FSK signal wherein the set is a sub-set of the plurality of sub-carriers, and to associate each FSK symbol frequency with a corresponding sub-carrier in the set of adjacent sub-carriers.

The arrangement also comprises selector (e.g. selecting circuitry) configured to select, for each FSK symbol to be transmitted, an FSK symbol phase such that an FSK signal phase at a start of the FSK symbol to be transmitted meets a phase difference criterion in relation to the FSK signal phase at an end of an immediately previous FSK symbol.

Furthermore, the arrangement comprises a signal generator (e.g. signal generating circuitry) configured to generate the FSK signal comprising the FSK symbol to be transmitted by modulation of the sub-carrier corresponding to the FSK symbol frequency based on the FSK symbol phase and muting the remaining sub-carriers of the set.

In some embodiments, the arrangement may also comprise a transmitter (e.g. transmitter circuitry) configured to transmit the OFDM signal.

A fifth aspect is an orthogonal frequency division multiple access (OFDMA) transmitter comprising the arrangement of any of the third or fourth aspects.

A sixth aspect is an access point comprising the OFDMA transmitter of the fifth aspect or the arrangement of any of the third or fourth aspects.

In some embodiments, any of the above aspects may additionally have features identical with or corresponding to any of the various features as explained above for any of the other aspects.

Generating an FSK signal comprised in an OFDM signal (e.g. by using an IFFT modulator) has the advantage that the FSK signal is orthogonal to other parts of the OFDM signal. An advantage of some embodiments is that distortion is minimized, or at least mitigated, when generating an FSK signal comprised in an OFDM compared to generation of an FSK signal comprised in an OFDM signal without application of any of the embodiments presented herein.

Another advantage of some embodiments is that discontinuities in the transfer from one FSK symbol to an immediately subsequent FSK symbol are absent. An advantage of some embodiments is that such discontinuities have a decreased absolute value compared to approaches where embodiments presented herein are not applied).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where a phase of an FSK symbol to be transmitted is selected such that the phase at the start of the FSK symbol meets a phase difference criterion (e.g. is equal to or is approximately equal to) in relation to the phase at an end of an immediately previous FSK symbol. An advantage of such an approach is that discontinuities between the transmitted FSK symbols are minimized (or at least mitigated) which in turn minimizes (or at least mitigates) disturbances caused by such discontinuities (e.g. out-of-band emission, distortions in a demodulator when the FSK signal is received, interference to adjacent signals, etc.). Since an FSK signal conveys its information only in the frequency of a symbol, the selection of the FSK symbol phase does not affect the information conveyed.

The selection approach is applied in association with generation of an FSK signal comprised in an OFDM signal, wherein a set of adjacent sub-carriers of the OFDM signal are assigned to transmission of the FSK signal and wherein each FSK symbol frequency is associated with a corresponding sub-carrier in the set of adjacent sub-carriers.

Figure 1:
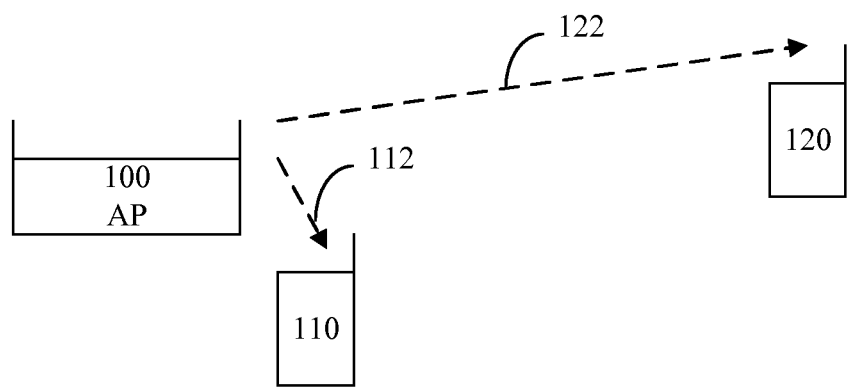
FIG. 1 is a schematic drawing illustrating an example scenario according to some embodiments.

FIG. 1 schematically illustrates an example scenario where some embodiments may be applicable. In this scenario, an access point (AP) 100 transmits to two different wireless communication devices 110, 120 as shown, respectively, at 112, 122. For example, the wireless communication device 110 may be a non-IoT device adapted to receive signals using an OFDM receiver and the wireless communication device 120 may be an IoT device adapted to receive signals using a less complex receiver (e.g. a GFSK receiver). As explained above, it may be desirable to generate a signal intended for the wireless communication device 120 as an FSK signal comprised in an OFDM signal where at least part of the OFDM signal is intended for the wireless communication device 110.

Thus, in the scenario illustrated in FIG. 1, it may be supposed that the AP 100 is configured to support two different types of wireless communication devices (e.g. stations; STA), one 110 able to transmit and receive high data rates, the other 120 only able to transmit and receive considerably lower data rates. For example, the wireless communication device 110 may be compliant with IEEE802.11ax and able to transmit and receive signals of 20 MHz or more (e.g. 40, 80, or 160 MHz) using OFDM, while the wireless communication device 120 may be compliant with Bluetooth Low Energy (BLE) and able to transmit and receive using Gaussian frequency shift keying (GFSK). When the FSK frequencies of the FSK signal intended for the wireless communication device 120 correspond to frequencies compliant with a Bluetooth Low Energy specification, the BLE receiver of the wireless communication device 120 may be used also for reception of the FSK signal.

Figure 2:
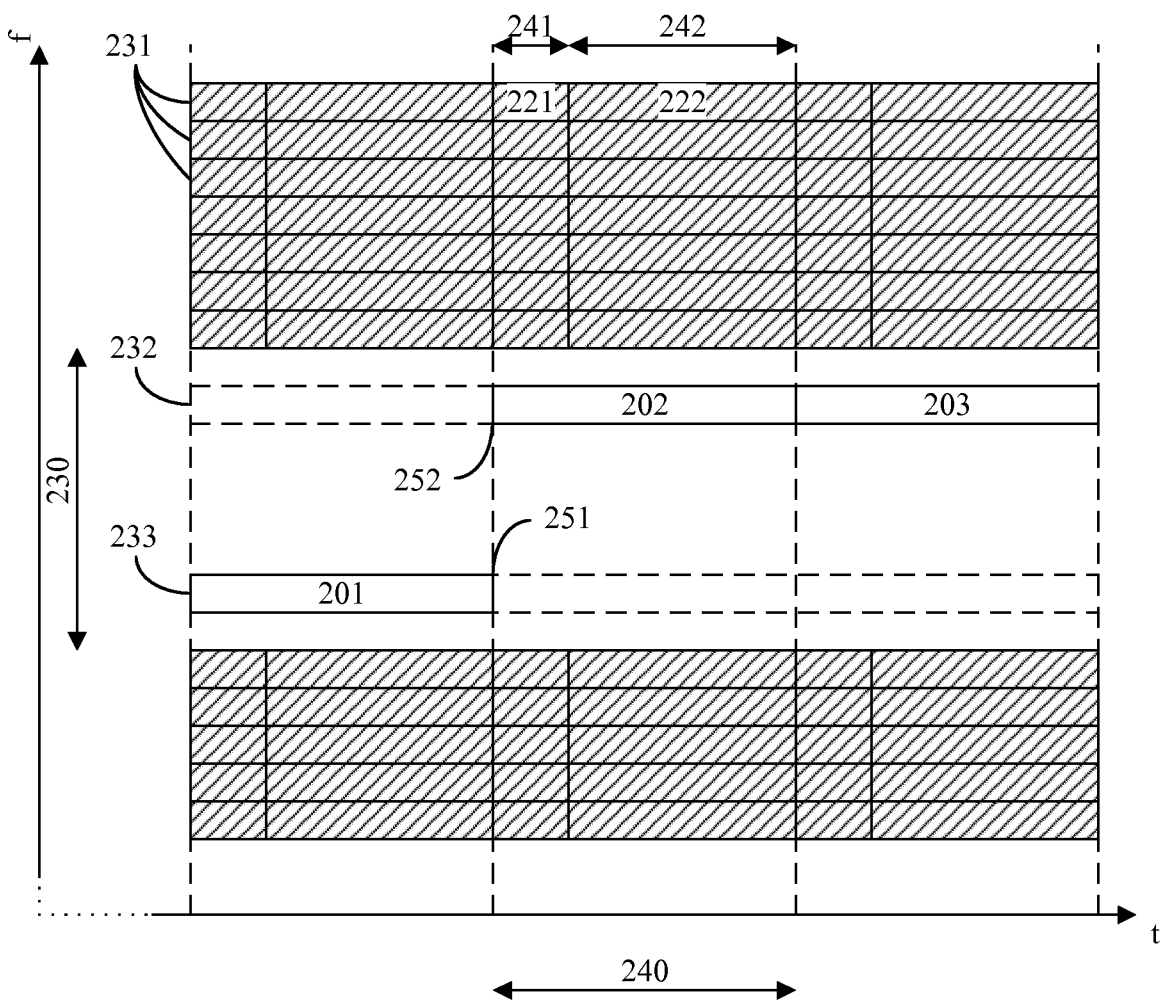
FIG. 2 is a schematic drawing illustrating an example FSK signal in a time-frequency grid according to some embodiments.

FIG. 2 schematically illustrates an example FSK signal comprised in an OFDM signal according to some embodiments. The signals are illustrated in relation to a time-frequency grid (t/f).

The OFDM signal comprises a plurality of sub-carriers, 231, 232, 233 and a set of adjacent sub-carriers 230 are assigned to transmission of the FSK signal. In this example the FSK signal is a binary FSK signal and each of the two FSK symbol frequencies is associated with a corresponding sub-carrier 232, 233 in the set of adjacent sub-carriers 230.

In the example illustrated in FIG. 2, the first FSK symbol 201 has a first value (e.g. representing a logical '0') while the second and third FSK symbols 202, 203 have a second value (e.g. representing a logical '1'). At symbol borders, there may be discontinuities when shifting from one FSK symbol to the next (e.g. from 201 to 202). Embodiments disclosed herein present selection of the phase of each FSK symbol (201, 202, 203) to be transmitted such as to minimize (or at least mitigate) such discontinuities. For example, the phase of the FSK symbol 202 may be selected such that the phase at the start 252 of the FSK symbol 202 meets a phase difference criterion in relation to the phase at the end 251 of the immediately previous FSK symbol 201.

The conventional part of the OFDM signal, occupying sub-carriers not assigned to transmission of the FSK signal, is illustrated by diagonally striped time-frequency occupancy. As is well known, each sub-carrier portion of an OFDM symbol 240 typically has a symbol part 222 of a certain symbol length (or duration) 242 and a cyclic prefix part 221 of a certain cyclic prefix length (or duration) 241.

Since the OFDM-signal comprises the cyclic prefixes and since the FSK signal is generated as comprised in the OFDM signal, using the same signal modulator as the conventional OFDM signal, selection of the phase of the FSK symbols involves determining how to modulate the sub-carrier that represents the FSK symbol frequency to accomplish the minimization (or at least mitigation) of the discontinuities. Typically, the selected phase of the FSK symbol may be used to modulate the sub-carrier that represents the FSK symbol frequency while the selected phase of the FSK symbol may be different than (but depending from) the phase at the start of the FSK symbol.

Figure 3:
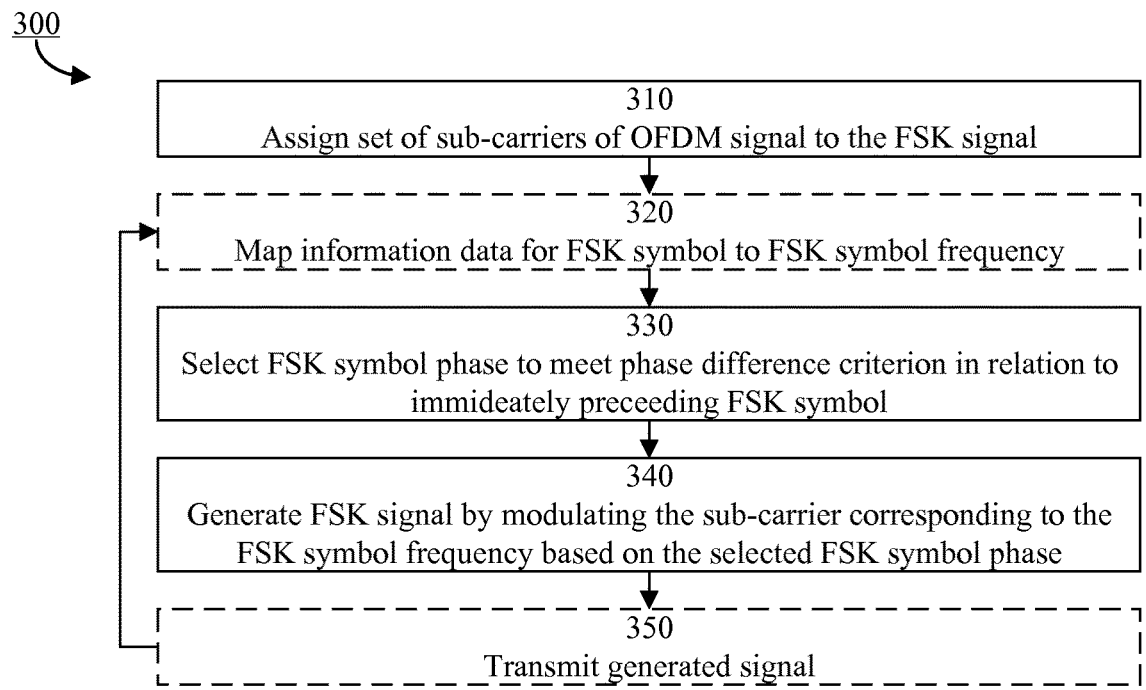
FIG. 3 is a flowchart illustrating example method steps according to some embodiments.

FIG. 3 is a flowchart illustrating an example method 300 according to some embodiments. The method is for generating an FSK signal (comprising FSK symbols wherein each FSK symbol has a corresponding FSK symbol frequency)

comprised in an OFDM signal comprising a plurality of sub-carriers, as exemplified in FIG. 2.

The method starts in step 310 where a set of adjacent sub-carriers of the OFDM signal is assigned to transmission of the FSK signal (compare with 230 of FIG. 2) and each FSK symbol frequency is associated with a corresponding sub-carrier in the set of adjacent sub-carriers (compare with 232 and 233 of FIG. 2). Typically, the set of adjacent sub-carriers may correspond to a resource unit (RU) of the OFDM signal and the FSK symbol frequencies may be associated with corresponding sub-carriers that are evenly spread in the RU. For example, if binary FSK is applied, the corresponding subcarriers may be two sub-carriers in the RU which are equally separated from the center sub-carrier of the RU, but in different directions.

For each FSK symbol to be transmitted, the information data of the symbol (e.g. '0' or '1' for binary FSK) is mapped to a corresponding FSK symbol frequency as is well known in the art. This is illustrated in step 320 and typically comprises mapping the information data to the corresponding sub-carrier in the set of adjacent sub-carriers (compare with 232 and 233 of FIG. 2).

In step 330, an FSK symbol phase is selected such that an FSK signal phase at a start of the FSK symbol to be transmitted meets a phase difference criterion in relation to the FSK signal phase at an end of an immediately previous FSK symbol. The selection of step 330 may be implemented in various ways as will be exemplified later herein.

Then, in step 340, FSK signal generation comprises modulating the sub-carrier corresponding to the FSK symbol frequency based on the selected FSK symbol phase. The remaining sub-carriers of the set assigned to transmission of the FSK signal are muted during the current symbol. Typically, the OFDM signal (and thereby the FSK signal) may be generated using an IFFT modulator. Then, modulating the sub-carrier corresponding to the FSK symbol frequency based on the selected FSK symbol phase may comprise letting the input for that sub-carrier to the IFFT modulator be a complex number with a phase that equals the selected FSK symbol phase, and muting the remaining sub-carriers of the set may comprise letting the inputs for those sub-carriers to the IFFT modulator be equal to zero.

The generated OFDM signal is typically transmitted on a symbol-by-symbol basis after it is generated for a symbol. This is illustrated by step 350 in FIG. 3.

Steps 320, 330, 340 and 350 may then be iterated for the next FSK symbol. It should be noticed that, in practice, the steps of mapping, selection, generation and transmission may very well take place partly or fully in parallel, each step processing a different FSK symbol of the FSK signal.

According to step 330, the FSK symbol phase should be selected such that an FSK signal phase at a start of the FSK symbol to be transmitted meets a phase difference criterion in relation to the FSK signal phase at an end of an immediately previous FSK symbol.

In a typical example which may be termed an ideal selection approach, the phase difference criterion may comprise the FSK signal phase at the start of the FSK symbol to be transmitted being equal to the FSK signal phase at the end of the immediately previous FSK symbol. Hence, the FSK signal phase is selected so that no discontinuity occurs at the symbol border.

In some implementations, such exact selection may be impossible (e.g. if there are only a limited number of phases available; typically specified in analogy with a PSK signal constellation) or cumbersome (e.g. requiring large complexity). Then, it may be desirable to select the FSK signal phase such that the result is as close as possible to the ideal selection approach. In these scenarios, several definitions of the phase difference criterion are possible and a few examples will be given in the following.

In a first example, the phase difference criterion may comprise an absolute phase difference being less than a phase difference threshold, wherein the absolute phase difference is determined between the FSK signal phase at the start of the FSK symbol to be transmitted and the FSK signal phase at the end of the immediately previous FSK symbol. Hence, the FSK signal phase is selected so that the absolute value of the discontinuity is less than a threshold value.

In a second example (which may overlap with the first example), the FSK signal phase is selected from a limited number of available phases (e.g. those of a PSK signal constellation). The phase which is closest to the phase of the ideal selection approach may be selected, i.e. an absolute phase difference between the selected phase and the FSK signal phase at the end of the immediately previous FSK symbol being smaller than an absolute phase difference between any other available phase and the FSK signal phase at the end of the immediately previous FSK symbol. For example, this may be achieved by comparing all absolute phase differences between any available phase and the FSK signal phase at the end of the immediately previous FSK symbol, and selecting the phase corresponding to the smallest absolute phase difference.

Since the FSK signal is to be modulated as comprised in the OFDM signal, the selection of the FSK symbol phase typically involves relating (e.g. transforming) the FSK signal phase at the start of the FSK symbol to determine the FSK symbol phase. Such transformation may typically take into account one or more of the length (duration) of the cyclic prefix, the length (duration) of the OFDM symbol without the cyclic prefix, and the FSK symbol frequency.

For example, selecting the FSK symbol phase may comprise letting the FSK symbol phase equal the FSK signal phase at the start of the FSK symbol to be transmitted plus a compensation term, wherein the compensation term is based on the ratio between the duration of the cyclic prefix and the duration of the OFDM symbol without the cyclic prefix and on a difference between the FSK symbol frequency and a center frequency of the set of adjacent sub-carriers.

Typically, the compensation term takes into account how much the phase is changed during the cyclic prefix. Thus, the FSK symbol phase may typically be selected as the FSK signal phase at the start of the FSK symbol (which is equal to or at least similar to the FSK signal phase at the end of the immediately previous FSK symbol according to the phase difference criterion as explained above) plus the compensation term which is an expression of the phase shift that occurs during the cyclic prefix. The phase shift may be determined via calculation of the product between the duration of the cyclic prefix and the frequency of the FSK symbol (i.e. of the corresponding sub-carrier). Typically, the frequency of the FSK symbol may be given in as it appears in a baseband signal, i.e. in relation to a direct current (DC) sub-carrier.

Thus, if the FSK signal phase at the start of FSK symbol k is denoted $\varphi_k^{start}$, the duration of the cyclic prefix (compare with 241 of FIG. 2) is denoted $T_{CP}$, and the frequency of the sub-carrier corresponding to the frequency of FSK symbol k is denoted $f_k$, the FSK symbol phase for FSK symbol k may be selected as $\arg(M_k) = \varphi_k^{start} + 2\pi T_{CP} f_k$, where $M_k$ is a complex number that may be used as input to the IFFT.

In the following exemplifying part, it will be assumed that the FSK signal phase $\varphi_k^{start}$ at the start of the FSK symbol is equal to the FSK signal phase $\varphi_{k-1}^{end}$ at the end of the immediately previous FSK symbol, and hence that $\arg(M_k)=\varphi_{k-1}^{end}+2\pi T_{CP}f_k$. The duration of the OFDM symbol without the cyclic prefix (compare with 242 of FIG. 2) will be denoted $T_u$.

In this example, OFDM symbols comprising only one active sub-carrier are considered. This is sufficient for the purposes of illustration of FSK generation by an OFDM transmitter. More generally, generation of OFDM symbols with only one active subcarrier within an RU assigned for FSK signaling may be envisioned.

In order to obtain a continuous phase between symbols $S_{k-1}$ and $S_k$ in this example, the following expression of $S_k$ over time (where time goes from the end of the cyclic prefix to the end of the symbol) may be considered:

$$S_k(t) = M_k \exp(i2\pi d_k n_k \Delta f t), \ 0 \leq t \leq T_u.$$

Here $d_k$ denotes the binary data corresponding to +1 or −1 (depending on whether a '0' or a '1' is to be conveyed logically), $\Delta f$ denotes the sub-carrier spacing, and $n_k$ denotes the sub-carrier corresponding to the FSK symbol frequency (counted in relation to the DC sub-carrier). Then, the FSK signal phase at the start of FSK symbol k becomes:

$$\varphi_k^{start} = \arg(M_k) - 2\pi d_k n_k \Delta f T_{CP}.$$

Hence, according to this example and assuming that $\Delta f = 1/T_u$, the FSK symbol phase should be selected as:

$$\arg(M_k) = \varphi_{k-1}^{end} + 2\pi d_k n_k \frac{T_{CP}}{T_u}.$$

In many practical systems, the ratio $$\frac{T_u}{T_{CP}}$$

is an integer. In his case the resulting phase will be within a finite set, which typically corresponds to common modulation symbols used for PSK of any applicable constellation size. For example, if $$\varphi_0^{start} = 0, \ \frac{T_u}{T_{CP}} = 4,$$

and $n_k=3$, a set of possible phases may be $$\arg(M_k) = \varphi_{k-1}^{end} + 2\pi d_k n_k \frac{3}{4} \in \{0, \pi/2, \pi, 3\pi/2\}.$$

If $$\frac{T_u}{T_{CP}}$$

is not an integer, the set of possible resulting phases may be infinite. Then, one may either use the closest signal point of a PSK signal constellation as an approximation or calculate the exact value of the phase for every symbol rather than using a signal point from a PSK signal constellation.

Figure 4:
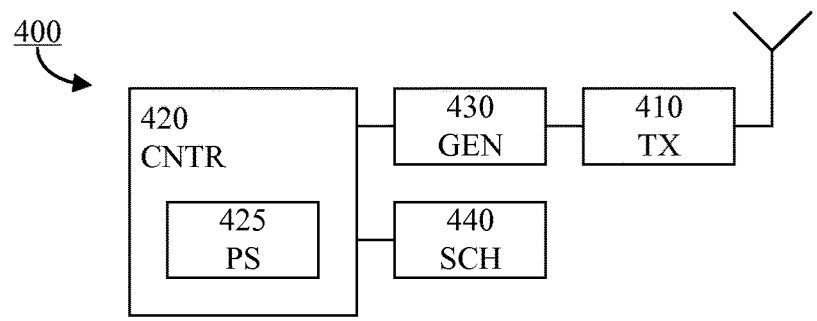
FIG. 4 is a schematic block diagram illustrating an example arrangement according to some embodiments.

FIG. 4 is a schematic illustration of an example arrangement 400 according to some embodiments. The arrangement 400 is for, and may be comprised in, an OFDMA transmitter and/or an access point (or network node). The arrangement 400 may, for example, be configured to cause performance of the method as described in connection with FIG. 3.

The arrangement is for generation of an FSK signal comprised in an OFDM signal, which comprises a plurality of sub-carriers. It comprises a controller (CNTR) 420 configured to cause at least the method steps 310, 330 and 340 of FIG. 3.

In some embodiments, the controller may comprise or be otherwise associated with one or more of a scheduler (SCH) 440, a signal generator (GEN) 430, a phase selector (PS) 425 and a transmitter (TX) 410.

The controller 420 may be configured to cause assignment of a set of adjacent sub-carriers to transmission of the FSK signal wherein the set is a sub-set of the plurality of sub-carriers, and association of each FSK symbol frequency with a corresponding sub-carrier in the set of adjacent sub-carriers. Such assignment and association may, for example, be performed by the scheduler 440.

The controller 420 may also be configured to cause selection, for each FSK symbol to be transmitted, of an FSK symbol phase such that an FSK signal phase at a start of the FSK symbol to be transmitted meets a phase difference criterion in relation to the FSK signal phase at an end of an immediately previous FSK symbol. Such selection may, for example, be performed by the phase selector 425.

Furthermore, the controller 420 may be configured to cause generation of the FSK signal comprising the FSK symbol to be transmitted by modulation of the sub-carrier corresponding to the FSK symbol frequency based on the FSK symbol phase and muting the remaining sub-carriers of the set. Such generation may, for example, be performed by the signal generator (e.g. comprising an IFFT modulator).

The controller may also be configured to cause transmission of the generated OFDM signal. The transmission may, for example, be performed by the transmitter 410.

Figure 5:
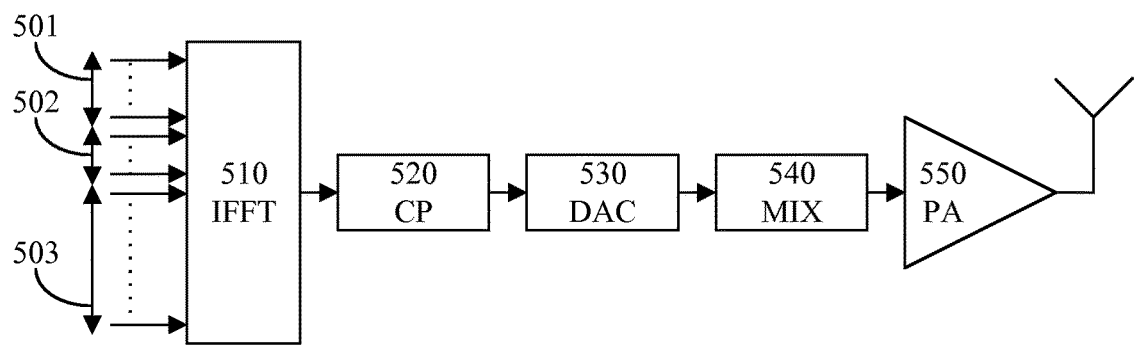
FIG. 5 is a schematic block diagram illustrating an example transmitter chain according to some embodiments.

FIG. 5 schematically illustrates an example transmitter chain for generating an FSK signal comprised in an OFDM signal according to some embodiments. For example, the transmitter chain may represent an implementation of the signal generator 430 and the transmitter 410 of FIG. 4.

The example transmitter chain comprises an IFFT 510, a cyclic prefix adder (CP) 520, a digital-to-analog converter (DAC) 530, a mixer (MIX) and a power amplifier (PA) 550. All of these functional blocks may operate in a conventional manner which is well known in the art.

However, a set of adjacent sub-carriers may be assigned to transmission of the FSK signal, and each FSK symbol frequency may be associated with a corresponding sub-carrier in the set of adjacent sub-carriers. Inputs of the IFFT that correspond to the assigned set of adjacent sub-carriers (502) are used to generate the FSK signal as descried above and the other inputs of the IFFT (501, 503) are used to generate the conventional part of the OFDM signal.

Figure 6:
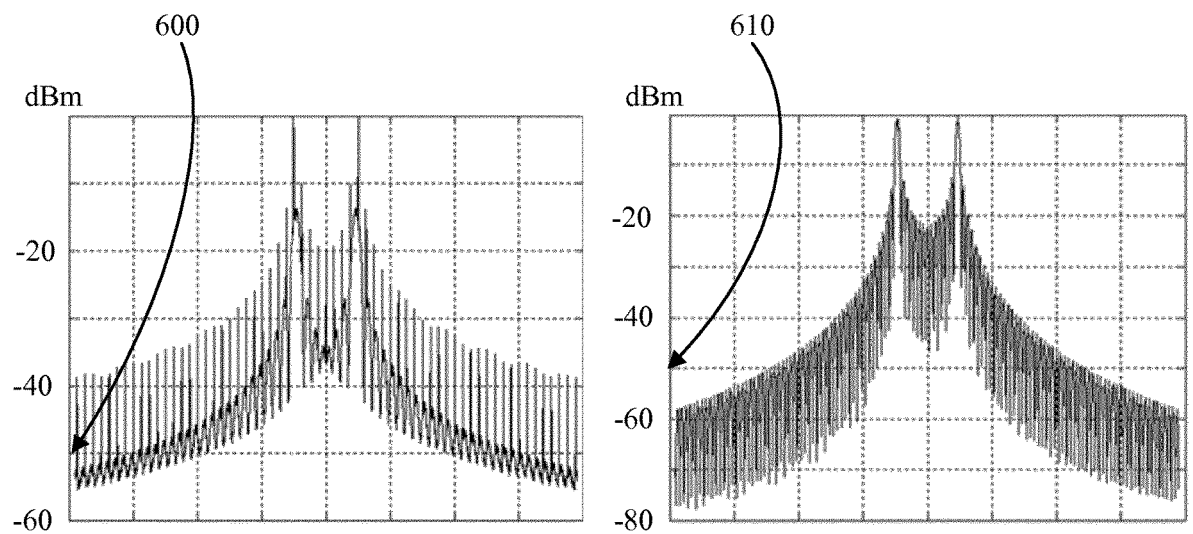
FIG. 6 is a pair or plots illustrating example advantages according to some embodiments.

FIG. 6 is a pair or plots illustrating example advantages according to some embodiments. The plots illustrate a power spectral density of the transmitted signal for a case where no effort is made to avoid discontinuities (left) and for a case where discontinuities are mitigated using the methods described herein (right). The power spectral density value of −50 dBm is indicated for both plots by reference numbers 600 and 610. As may be seen, this exemplifies that mitigating discontinuities may significantly improve the power spectral density.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node (access point).

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 7:
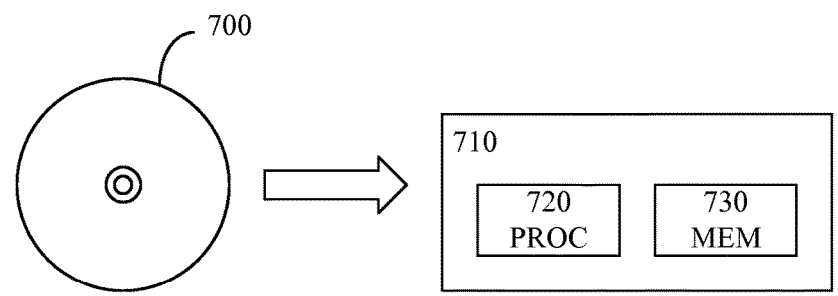
FIG. 7 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC) 720, which may, for example, be comprised in a network node 710. When loaded into the data processing unit, the computer program may be stored in a memory (MEM) 730 associated with or comprised in the data-processing unit. According to some embodiments, the computer program may, when loaded into and run by the data processing unit, cause execution of method steps according to, for example, the method illustrated in FIG. 3.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method of generating a frequency shift keying (FSK) signal comprised in an orthogonal frequency division multiplexing (OFDM) signal comprising a plurality of sub-carriers, the FSK signal comprising FSK symbols wherein each FSK symbol has a corresponding FSK symbol frequency, the method comprising:
    assigning a set of adjacent sub-carriers to transmission of the FSK signal wherein the set is a sub-set of the plurality of sub-carriers, and associating each FSK symbol frequency with a corresponding sub-carrier in the set of adjacent sub-carriers;
    selecting, for each FSK symbol to be transmitted, an FSK symbol phase such that an FSK signal phase at a start of the FSK symbol to be transmitted meets a phase difference criterion in relation to the FSK signal phase at an end of an immediately previous FSK symbol; and
    generating the FSK signal comprising the FSK symbol to be transmitted by modulating the sub-carrier corresponding to the FSK symbol frequency based on the selected FSK symbol phase and muting the remaining sub-carriers of the set.

2. The method of claim 1, wherein the phase difference criterion comprises an absolute phase difference being less than a phase difference threshold, wherein the absolute phase difference is determined between the FSK signal phase at the start of the FSK symbol to be transmitted and the FSK signal phase at the end of the immediately previous FSK symbol.

3. The method of claim 1, wherein selecting the FSK symbol phase comprises selecting a phase of a phase shift keying (PSK) signal constellation, wherein an absolute phase difference between the selected phase and the FSK signal phase at the end of the immediately previous FSK symbol is smaller than an absolute phase difference between any other phase of the PSK signal constellation and the FSK signal phase at the end of the immediately previous FSK symbol.

4. The method of claim wherein the phase difference criterion comprises the FSK signal phase at the start of the FSK symbol to be transmitted being equal to the FSK signal phase at the end of the immediately previous FSK symbol.

5. The method of claim 1, wherein selecting the FSK symbol phase comprises relating the FSK symbol phase to be selected to the FSK signal phase at the start of the FSK symbol to be transmitted via the corresponding FSK symbol frequency.

6. The method of claim 1, wherein selecting the FSK symbol phase comprises relating the FSK symbol phase to be selected to the FSK signal phase at the start of the FSK symbol to be transmitted via a ratio between a duration of a cyclic prefix of the OFDM signal and a duration of an OFDM symbol of the OFDM signal without the cyclic prefix.

7. The method of claim 6, wherein selecting the FSK symbol phase comprises letting the FSK symbol phase to be selected equal the FSK signal phase at the start of the FSK symbol to be transmitted plus a compensation term which is based on the ratio and on a difference between the FSK symbol frequency and a center frequency of the set of adjacent sub-carriers.

8. The method of claim 1, wherein the FSK signal is for transmission to a receiver configured to receive a Gaussian FSK signal.

9. The method of claim 1, wherein the FSK frequencies correspond to frequencies compliant with a Bluetooth Low Energy specification.

10. A computer program product comprising a non-transitory computer readable medium, having thereon a computer program comprising program instructions, the computer program being loadable into a data processing unit and configured to cause execution of a method when the computer program is run by the data processing unit, wherein the method is for generating a frequency shift keying (FSK) signal comprised in an orthogonal frequency division multiplexing (OFDM) signal comprising a plurality of sub-carriers, the FSK signal comprising FSK symbols wherein each FSK symbol has a corresponding FSK symbol frequency, and wherein the method comprises:

assigning a set of adjacent sub-carriers to transmission of the FSK signal wherein the set is a sub-set of the plurality of sub-carriers, and associating each FSK symbol frequency with a corresponding sub-carrier in the set of adjacent sub-carriers;

selecting, for each FSK symbol to be transmitted, an FSK symbol phase such that an FSK signal phase at a start of the FSK symbol to be transmitted meets a phase difference criterion in relation to the FSK signal phase at an end of an immediately previous FSK symbol; and generating the FSK signal comprising the FSK symbol to be transmitted by modulating the sub-carrier corresponding to the FSK symbol frequency based on the selected FSK symbol phase and muting the remaining sub-carriers of the set.

11. An arrangement for an orthogonal frequency division multiple access (OFDMA) transmitter for generation of a frequency shift keying (FSK) signal comprised in an orthogonal frequency division multiplexing (OFDM) signal comprising a plurality of sub-carriers, the FSK signal comprising FSK symbols wherein each FSK symbol has a corresponding FSK symbol frequency, the arrangement comprising a controller configured to cause:

assignment of a set of adjacent sub-carriers to transmission of the FSK signal wherein the set is a sub-set of the plurality of sub-carriers, and association of each FSK symbol frequency with a corresponding sub-carrier in the set of adjacent sub-carriers;

selection, for each FSK symbol to be transmitted, of an FSK symbol phase such that an FSK signal phase at a start of the FSK symbol to be transmitted meets a phase difference criterion in relation to the FSK signal phase at an end of an immediately previous FSK symbol; and generation of the FSK signal comprising the FSK symbol to be transmitted by modulation of the sub-carrier corresponding to the FSK symbol frequency based on the FSK symbol phase and muting the remaining sub-carriers of the set.

12. The arrangement of claim 11, wherein the phase difference criterion comprises an absolute phase difference being less than a phase difference threshold, wherein the absolute phase difference is determined between the FSK signal phase at the start of the FSK symbol to be transmitted and the FSK signal phase at the end of the immediately previous FSK symbol.

13. The arrangement of claim 11, wherein the controller is configured to cause the selection of the FSK symbol phase by causing selection of a phase of a phase shift keying (PSK) signal constellation, wherein an absolute phase difference between the selected phase and the FSK signal phase at the end of the immediately previous FSK symbol is smaller than an absolute phase difference between any other phase of the PSK signal constellation and the FSK signal phase at the end of the immediately previous FSK symbol.

14. The arrangement of claim 11, wherein the phase difference criterion comprises the FSK signal phase at the start of the FSK symbol to be transmitted being equal to the FSK signal phase at the end of the immediately previous FSK symbol.

15. The arrangement of claim 11, wherein the FSK frequencies correspond to frequencies compliant with a Bluetooth Low Energy specification.

16. An orthogonal frequency division multiple access (OFDMA) transmitter comprising the arrangement of claim 11.

17. An access point comprising the OFDMA transmitter of claim 16.

18. An access point comprising the arrangement of claim 11.

* * * * *